US012608460B2

(12) United States Patent
Sarvana

(10) Patent No.: US 12,608,460 B2
(45) Date of Patent: Apr. 21, 2026

(54) USING AUTHENTICATION CHALLENGES TO AUTOMATICALLY OBTAIN TRAINING DATA TO TRAIN A MACHINE LEARNING MODEL

(71) Applicant: Google LLC, Mountain View, CA (US)

(72) Inventor: Obaid Sarvana, Plainfield, IL (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/368,274

(22) Filed: Sep. 14, 2023

(65) Prior Publication Data

US 2025/0094556 A1      Mar. 20, 2025

(51) Int. Cl.
*G06F 21/36*          (2013.01)
(52) U.S. Cl.
CPC .................................... *G06F 21/36* (2013.01)
(58) Field of Classification Search
CPC ....................................................... G06F 21/36
See application file for complete search history.

(56) References Cited

U.S. PATENT DOCUMENTS

| | | | |
|---|---|---|---|
| 11,611,608 B1 * | 3/2023 | Smith ................ | G02B 27/0172 |
| 2020/0210490 A1 * | 7/2020 | Hutchins .............. | G06V 30/412 |
| 2020/0244639 A1 * | 7/2020 | Arif Khan ............. | G06N 20/10 |

* cited by examiner

*Primary Examiner* — Hany S. Gadalla
(74) *Attorney, Agent, or Firm* — Lowenstein Sandler LLP

(57)          ABSTRACT

A method for using authentication challenges to automatically obtain training data to train a machine learning model (MLM). The method includes identifying a generative MLM to be trained using training data reflecting analytical responses of humans, and automatically collecting the training data from a plurality of users by providing an authentication challenge for each user attempting to access a resource. The authentication challenge requests a set of responses from a respective user of the plurality of users. The set of responses include a first response to a first sample which indicates whether the respective user is a human, and a second response to a second sample which indicates an analytical response of the respective user. Responsive to determining that the respective user is a human, the second response is used as part of the training data for the generative MLM.

20 Claims, 6 Drawing Sheets

400

Identify at least one generative machine learning model (MLM) to be trained using training data reflecting analytical responses of humans 410

Automatically collect the training data for the at least one generative MLM, wherein automatically collecting the training data comprises: 420

Provide an authentication challenge for each user attempting to access a resource, wherein the authentication challenge requests a set of responses from a respective user, the set of responses comprising a first response to a first sample, wherein the first response indicates whether the respective user is a human, and a second response to a second sample, wherein the second response indicates an analytical response of the respective user 421

Responsive to determining, based on the set of responses, that the respective user is a human, use the second response provided by the respective user as part of the training data for the at least one generative MLM 422

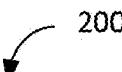
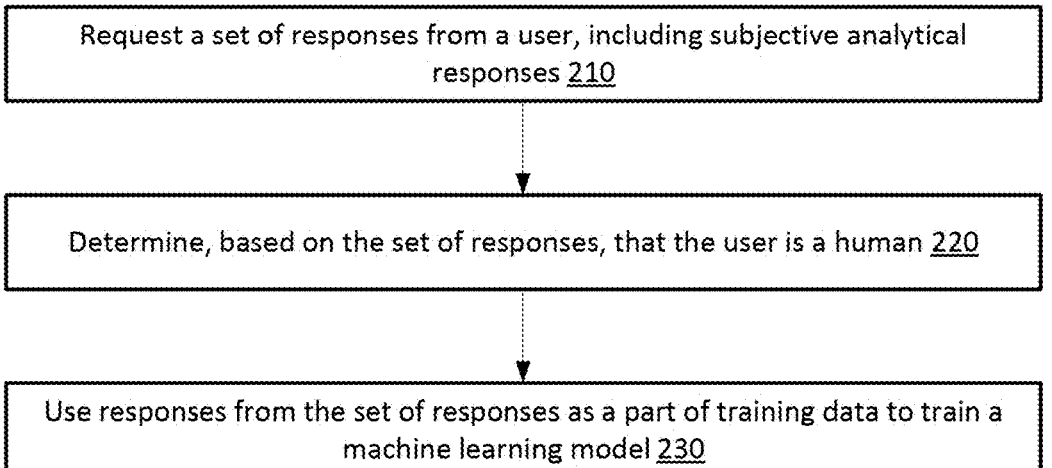
FIG. 2

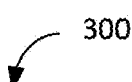
300
310
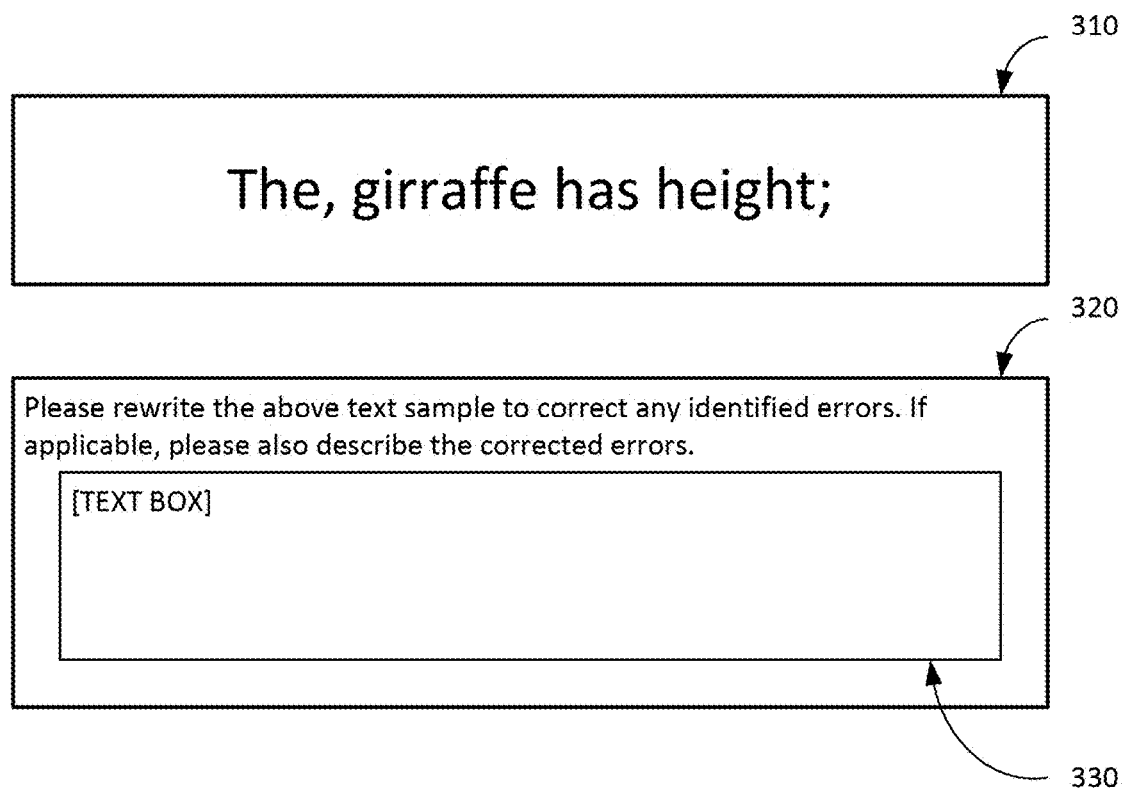
320
The, girraffe has height;
Please rewrite the above text sample to correct any identified errors. If applicable, please also describe the corrected errors.
[TEXT BOX]
330
FIG. 3A

Figure 3B:
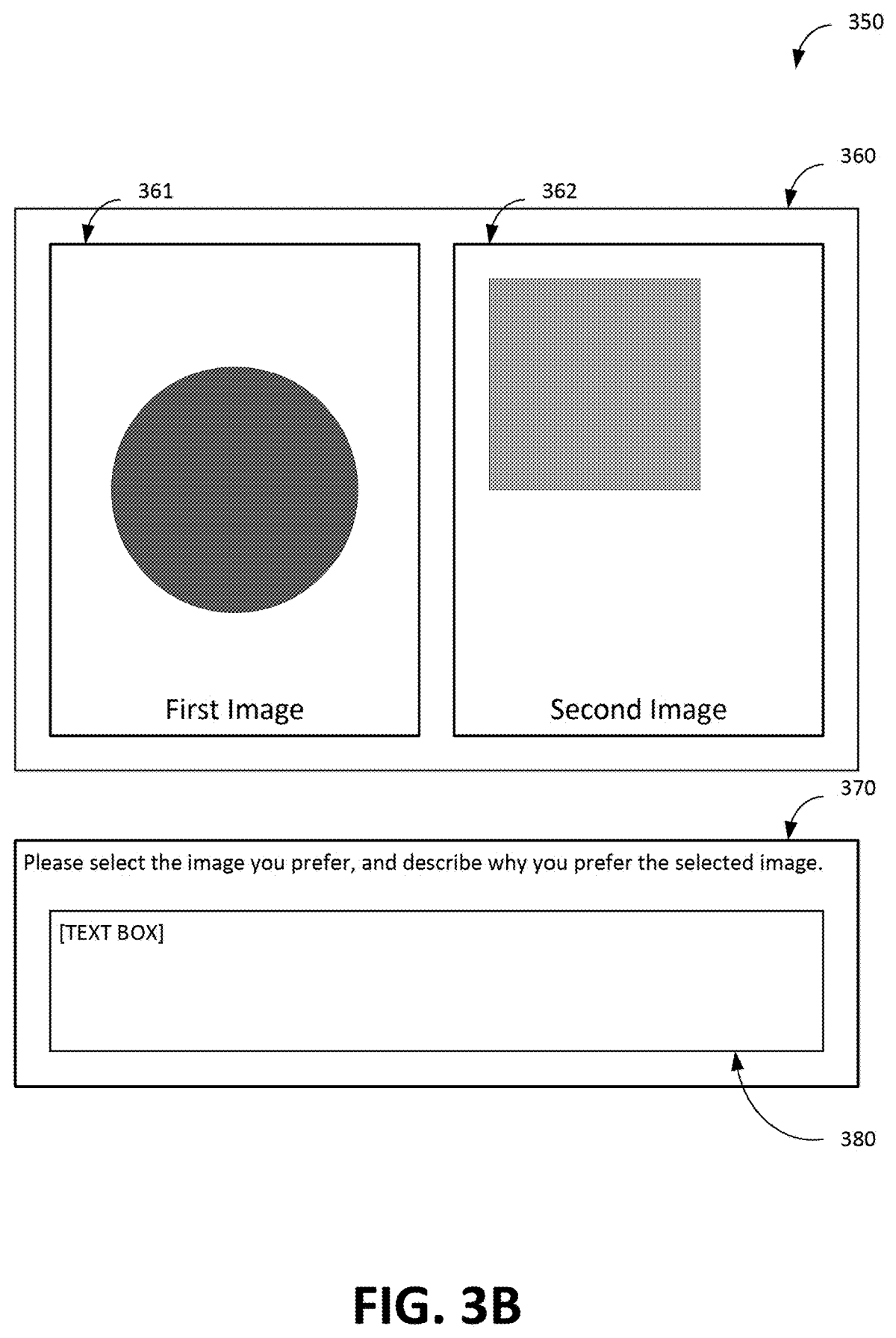

350

360

361                                               362

First Image                                Second Image

370

Please select the image you prefer, and describe why you prefer the selected image.

[TEXT BOX]

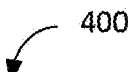

Identify at least one generative machine learning model (MLM) to be trained using training data reflecting analytical responses of humans 410

Automatically collect the training data for the at least one generative MLM, wherein automatically collecting the training data comprises: 420

Provide an authentication challenge for each user attempting to access a resource, wherein the authentication challenge requests a set of responses from a respective user, the set of responses comprising a first response to a first sample, wherein the first response indicates whether the respective user is a human, and a second response to a second sample, wherein the second response indicates an analytical response of the respective user 421

Responsive to determining, based on the set of responses, that the respective user is a human, use the second response provided by the respective user as part of the training data for the at least one generative MLM 422

FIG. 4

USING AUTHENTICATION CHALLENGES TO AUTOMATICALLY OBTAIN TRAINING DATA TO TRAIN A MACHINE LEARNING MODEL

TECHNICAL FIELD

Aspects and implementations of the present disclosure relate to using authentication challenges to automatically obtain training data to train a machine learning model.

BACKGROUND

Large datasets of user data are typically needed for training a machine learning model (MLM). Because the quality of a machine learning model (MLM) depends on the quality of the training dataset used to train the MLM, high-quality user data is desirable. However, evaluating collected user data to identify a high quality subset of the collected data can have a high cost that can typically be expressed as a function of the hourly cost to employ a human evaluator.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes identifying at least one generative machine learning model (MLM) to be trained using training data reflecting analytical responses of humans; and automatically collecting the training data for the at least one generative MLM from a plurality of users. Automatically collecting the training data includes providing an authentication challenge for each user attempting to access a resource. The authentication challenge requests a set of responses from a respective user of the plurality of users. The set of responses including a first response to a first sample which indicates whether the respective user is a human, and a second response to a second sample which indicates an analytical response of the respective user. Responsive to determining, based on the set of responses, that the respective user is a human, the second response provided by the respective user is used as part of the training data for the generative MLM.

In some aspects, the first sample includes a text sample, and requesting the respective user to provide the first response includes presenting the text sample to the respective user, and instructing the respective user to describe any error in the text sample.

In some aspects, the second sample includes a text sample, and requesting the respective user to provide the second response includes presenting the text sample to the respective user, and instructing the respective user to describe any error present in the text sample.

In some aspects, the second sample includes a set of images, and requesting the respective user to provide the second response includes presenting the set of images to the respective user, instructing the respective user to select, from the set of images, a preferred image, and instructing the respective user to provide a justification for the selection of the preferred image.

In some aspects, the first response is used for a preliminary determination of whether the respective user is a human, and the set of responses requested by the authentication challenge include a third response to a third sample to provide a confirmation of the preliminary determination.

In some aspects, the set of responses requested by the authentication challenge include a third response to a third sample. The third response indicates a second analytical response of the respective user.

In some aspects, providing the authentication challenge for each user attempting to access the resource includes selecting, from a plurality of samples, a known sample having a known response for use as the first sample, and selecting, from the plurality of samples, an unknown sample not having a known response for use as the second sample. In some aspects, the first response indicates that the respective user is a human if the first response corresponds to the known response. In some aspects, the method further includes converting the unknown sample to the known sample upon collecting a sufficient number of matching responses to the unknown sample. The sufficient number represents a number that exceeds a threshold. In some aspects, the method further includes generating, using one of the at least one generative MLM, a response to the known sample, and comparing the generated response to the known response to assess performance of the one of the at least one generative MLM. In some aspects, the method further includes generating, using one of the at least one generative MLM, the unknown sample.

In some aspects, the second sample and the second response provided by the respective user for the second sample are selected for a subset of training data to train the generative MLM based on (i) a quantity of samples provided to the respective user that received an associated response, and (ii) a quantity of users that provided a second response to the second sample.

An aspect of the disclosure provides a system including a memory an a processor communicatively coupled to the memory. The processor performs operations including identifying at least one generative machine learning model (MLM) to be trained using training data reflecting analytical responses of humans, and automatically collecting the training data for the at least one generative MLM from a plurality of users by providing an authentication challenge to each user attempting to access a resource. The authentication challenge requests a set of responses from a respective user of the plurality of users. The set of responses including a first response to a first sample, wherein the first response indicates whether the respective user is a human, and a second response to a second sample, wherein the second response indicates an analytical response of the respective user. Responsive to determining, based on the set of responses, that the respective user is a human, the second response provided by the respective user is used as part of the training data for the generative MLM.

In some aspects, the first response indicates that the respective user is a human if the first response corresponds to a known response to a known sample.

In some aspects, the operations further include generating, using one of the at least one generative MLM, the second sample.

In some aspects, the second sample includes a set of subsamples. Requesting the respective user to provide the second response includes the operations of presenting the set of subsamples to the respective user, instructing the respective user to select, from the set of subsamples, a preferred subsample, and instructing the respective user to provide a justification for the selection of the preferred subsample.

In some aspects, the at least one generative MLM is trained on a subset of the training data. The second sample and the second response provided by the respective user for the second sample are selected for the subset of training data based on (i) a quantity of samples provided to the respective user that received an associated response, and (ii) a quantity of users that provided a second response to the second sample.

An aspect of the disclosure provides a non-transitory computer readable storage medium including instructions for a server that, when executed by a processing device, cause the processing device to perform operations including identifying at least one generative machine learning model (MLM) to be training using training data reflecting analytical responses of humans, and automatically collecting the training data for the at least one generative MLM from a plurality of users by providing an authentication challenge for each user attempting to access a resource. The authentication challenge requests a set of responses from a respective user of the plurality of users. The set of responses including a first response to a first sample which indicates whether the respective user is a human, and a second response to a second sample which indicates an analytical response of the respective user. Responsive to determining, based on the set of responses, that the respective user is a human, the second response provided by the respective user is used as part of the training data for the generative MLM.

In some aspects, the operations further include generating, using one of the at least one generative MLM, the second sample.

In some aspects, the at least one generative MLM is trained on a subset of the training data. The second sample and the second response provided by the respective user for the second sample are selected for the subset of training data based on (i) a quantity of samples provided to the respective user that received an associated response, and (ii) a quantity of users that provided a second response to the second sample.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2 depicts a flow diagram of an example method for automatically collecting training data for a generative MLM, in accordance with aspects of the present disclosure.

FIG. 3A depicts a block diagram of an example portion of an authentication challenge that can be used to request a response from a user, in accordance with aspects of the present disclosure.

FIG. 3B depicts a block diagram of an example portion of an authentication challenge that can be used to request a response from a user, in accordance with aspects of the present disclosure.

FIG. 4 depicts a flow diagram of an example method for automatically obtaining, using authentication challenges, training data to train a machine learning model, in accordance with aspects of the present disclosure.

DETAILED DESCRIPTION

Figure 1:
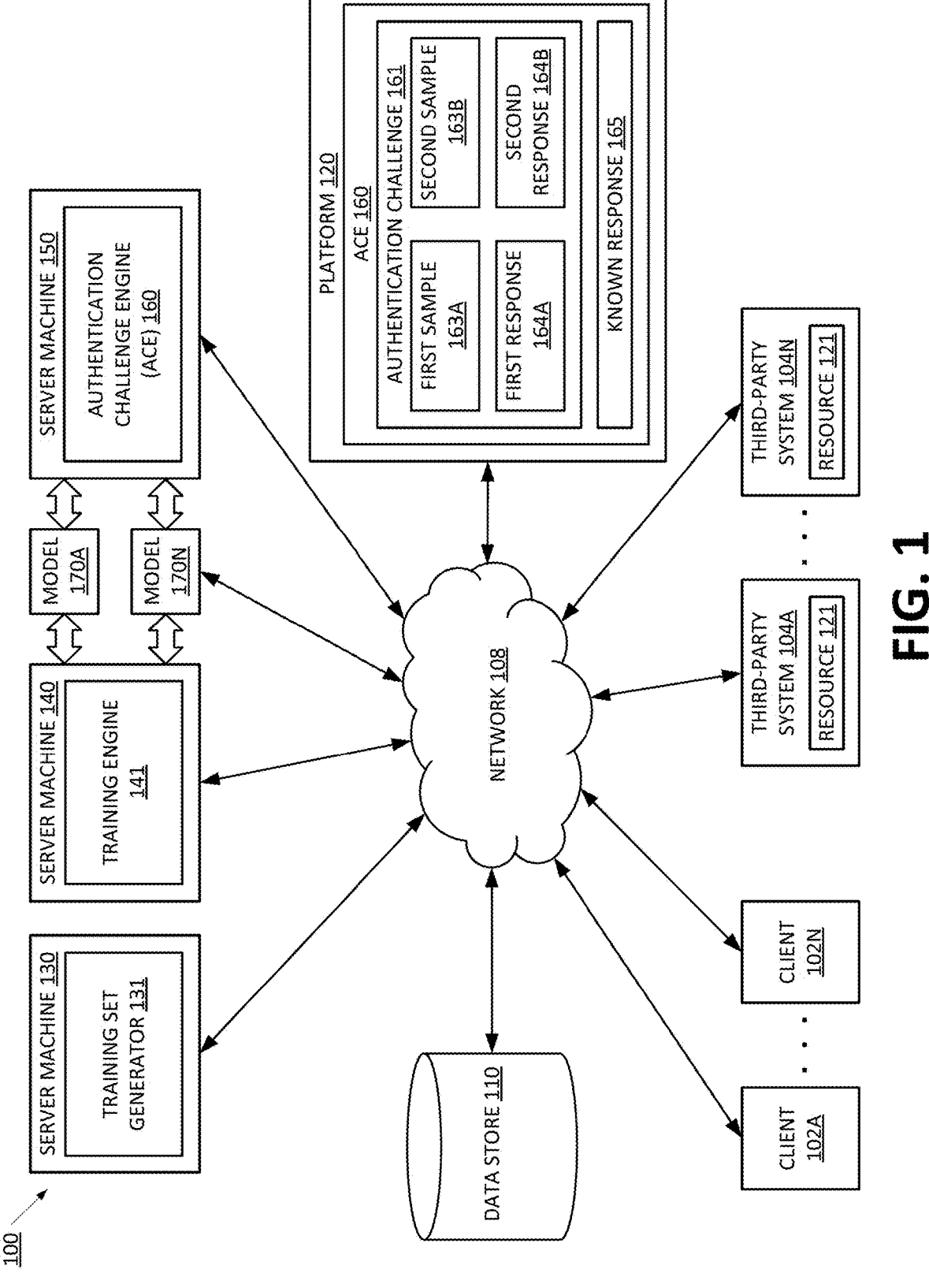
FIG. 1 illustrates an example system architecture, in accordance with aspects of the present disclosure.

Aspects of the present disclosure relate to using authentication challenges to automatically obtain training data to train a machine learning model (MLM).

One type of MLM is a generative machine learning model (generative MLM). A "generative MLM" can refer to a class of computational algorithms designed to create novel output data resembling given input data. Generative MLMs can be trained to create new content, such as text, images, audio, video, or other forms of information by leveraging patterns found in the training data used to train the generative MLM. For example, a generative MLM that generates text samples (such as a large language model (LLM)) can be trained using training data that includes text content in the public domain, licensed text content, and/or proprietary text content. Based on this training data, the text based generative MLM can learn broad language elements including general sentence structure, common phrases, vocabulary, natural language structure, and any other elements commonly associated with natural language in a large corpus of text. In some implementations, this type of training can be used to create a foundational model, which can afterwards be fine-tuned on data pertaining to a particular set of tasks to create a more task-specific, or targeted model. Foundational models can be trained using self-supervision, or unsupervised training on respective training datasets.

When refining a generative MLM through fine-tuning based on some elements of supervision, techniques that incorporate human or machine-generated feedback are used that adhere to specific guidelines during training, or training on a previously labeled dataset. In a non-limiting example associated with reinforcement learning, the outputs of the generative MLM during training can be ranked by a user based on factors such as accuracy, helpfulness, veracity, acceptability, or other pertinent metrics for fine-tuning the generative MLM. Thus, in such implementations, fine-tuning a generative MLM can include an initial collection and evaluation of data (to select data samples for use in the fine-tuning training dataset), and subsequent feedback for outputs generated during the fine-tuning training phase of the generative MLM. Notably, both the data collection and evaluation for the fine-tuning training dataset, as well as the subsequent requirements for feedback on generated outputs, can be expensive. The expense can typically be expressed as a function of the hourly cost to employ a human evaluator.

Aspects of the present disclosure address the above noted and other deficiencies by using authentication challenges to automatically obtain large amounts of training data to train a generative MLM. In particular, authentication challenges such as those used in CAPTCHA (Completely Automated Public Turing test to tell Computers and Humans Apart), can be modified to request user responses that indicate results of users' analytical thinking. Broadly implemented across multiple services, authentication challenges can be used to collect a large quantity of user data. The authentication challenge can include a request to the user to respond in ways that indicate human analysis and/or human intuition. Correct responses to particular portions of the authentication challenge can indicate that the user is a human, which can be used necessary for the service. Responses to other portions of the authentication challenge can indicate a sample of human analysis and/or human intuition. When a respective user indicates they are a human, information provided in other responses by the user to the authentication challenge can be used as part of training data to train a generative MLM. By using responses to authentication challenges that indicate human analysis and/or human intuition, data can be collected and evaluated by the human user for a minimal cost (e.g., the cost represented as a function of the expense to employ a human reviewer). Responses to the authentication challenge can provide user data that indicates human analysis and/or human intuition, as well as justification for a portion of the response provided by the user. In some implementations, authentication challenges can request "free" responses from respective users. A "free response" can refer to a free-form response that is not selected from a predetermined selection of responses for a question. For example, a response provided in a text box can be a free response, whereas a response selected from a set of multiple choice answers is not a free response.

One or more generative MLMs can be identified to be trained using training data reflecting analytical responses of humans. Automatically collecting training data for the one or more generative MLMs can be performed by providing authentication challenges, including questions relating to respective samples, to users and requesting responses to the questions from the users. A first challenge can include a request to provide a first response to a first question relating to a first sample, and a second challenge can include a request to provide a second response to a second question relating to a second sample. The first response and the first sample can be used to determine whether the user is a human, and the second response and the second sample can be used to obtain an analytical response of the user. If the user is determined to be a human, the second response can be used as part of training data for the identified generative MLM. In some implementations, the second sample can be paired to the second response and the pair can be used as part of training data for the identified generative MLM. In some implementations, a second response for a second sample is only provided to a user if the first response for the first sample indicates the user is a human. In some implementations, a generative MLM can be used to create new samples to be included in authentication challenges. In some implementations, a generative MLM can be used to created predicted responses to samples. The predicted responses can be compared to user responses to evaluate the quality of the generative MLM used to create the predicted responses.

Advantages of using an authentication challenge to collect human analytical responses include reducing the cost of creating a training dataset, collecting a large volume of data at scale from a diverse population, and creating a closed loop for model improvement that requires minimal-to-no human intervention. For example, the cost required to create the training dataset can include computing resources for operating the one or more generative MLMs to create authentication challenges and predicted responses, collecting evaluations of the generated data, storing the data to be evaluated, and evaluating the generated data. It will be appreciated that while the figures and examples below demonstrate specific examples of data that can be generated and specific forms of evaluating the data, these specific examples of data and forms of evaluating the data are used only illustratively, and the disclosed systems and methods can also include other data types and evaluation techniques.

FIG. 1 illustrates an example system architecture 100, in accordance with aspects of the present disclosure. The system architecture 100 (also referred to as "system" herein) includes client devices 102A-N, a data store 110, a platform 120, server machines 130-150, and/or third party systems 104A-N each connected to a network 108. In some implementations, network 108 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

The client devices 102A-N can each include computing devices such as personal computers (PCs), laptops, mobile phones, smart phones, tablet computers, netbook computers, network-connected televisions, etc. In some implementations, client devices 102A-N may also be referred to as "user devices." Each client 102 can include a web browser. In some implementations the web browser can be an application that provides a graphical user interface (GUI) for users to access the resource 121 of third party system 104. For example, the web browser can access, retrieve, present, and/or navigate the resource 121 provided by a web server. The web browser can render, display, and/or present content associated with the resource 121 to a user. In one example, the web browser can be a standalone application (e.g., a mobile application or app) that allows users to request, access, and/or view content associated with the resource 121. As such, the web browsers can be provided to the client devices 102A-N by platform 120.

A third party system 104A-N can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to host, manage and/or otherwise provide one or more resources 121 to clients 102A-N. A resource 121 can include a website, online service, database, repository, or any other network-based entity that can have restricted access which can be controlled based on a determination that a client device requesting access is being operated by a human. Clients 102 can access the third party systems 104 through the network 108. Third party systems 104 can include a user-facing webpage. Third party system 104 can include back-end software that can be used to provide a client 102 with access to resource 121. Third party systems 104 can restrict access to resource 121 to a subset of users of clients 102 that indicate they are a human. In some implementations, third party systems 104 can provide the client 102 with access to the resource 121 via the GUI of a web browser as described above.

In some implementations, data store 110 can be a persistent storage capable of storing data as well as data structures to tag, organize, and index data for the authentication challenge engine (ACE) 160. An authentication challenge data item can include authentication challenge 161, sample 163, known response 165, and unknown sample 167, in accordance with implementations described herein. Additionally, an authentication challenge data item can include an identification of a resource 121 on a third party system 104, an identification of an authentication challenge 161, an identification of samples 163, and an identification of responses 164. Data store 110 can be hosted by one or more storage devices, such as main memory, magnetic or optical storage based disks, tapes, or hard drives, and so forth. In some implementations, data store 110 can be a network-attached file server or some other type of persistent storage such as an object-oriented database, a relational database, and so forth, that may be hosted by server machine 150 or one or more different machines coupled to the platform 120 via network 108.

In some implementations, platform 120 and/or server machines 130-150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to automatically obtain training data to train a machine learning model (MLM) by creating authentication challenges 161, causing the authentication challenges 161 to be used by systems (e.g., third party systems 104A-N) to control access to respective resources 121, and/or obtaining responses 164 to samples 163 in the authentication challenges 161. In some implementations, resources 121 used for collecting training data can be predetermined based on contractual agreements with respective third party systems 104. The third party system 104 can provide an application programming interface (API) or a software program for receiving authentication challenges 161 and samples 163 from platform 120, and returning user responses 164 to those authentication challenges 161.

Platform 120 can include authentication challenge engine (ACE) 160 that allows platform 120 to determine whether or not a user of client 102 is a human. When a user of client 102 requests access to a resource 121 stored on a third party system 104, the third party system 104 can use the platform 120 to provide an authentication challenge 161 (e.g., a human authentication challenge) to the user of client 102. Authentication challenge 161 can include a first sample 163A and a second sample 163B. In some implementations the authentication challenge 161 can include additional samples 163C-N (not illustrated). The authentication challenge 161 can request, from the user of client 102, a first response 164A to the first sample 163A, and a second response 164B to the second sample 163B. The first response 164A can be associated with a known response 165. That is, the first response 164A can have an associated correct response, which is reflected here as known response 165. In some implementations, authentication challenge 161 can include a second known response (not illustrated) that is associated with second sample 163B. In some implementations, authentication challenges 161 can be generated by ACE 160. In some implementations, ACE 160 can retrieve respective authentication challenges 161, samples 163, or known responses 165 from data store 110.

Authentication challenges 161 provided to multiple clients 102A-N can include different first samples 163A and second samples 163B. For example, a user of client 102A might be provided with an authentication challenge 161 that has a first sample 163A of a math problem and a second sample 163B of a painting, while a user of client 102B might be provided with an authentication challenge 161 that has a first sample 163A of a second math problem and a second sample 163B of a third math problem. In some implementations, the authentication challenge 161 presented to a specific client 102 can be tailored to the specific client 102. ACE 160 can use a system of unique client identifiers to identify a user of a client 102 that has completed multiple authentication challenges 161, and provide specific authentication challenges 161 to the identified client 102. In some implementations, ACE 160 can use a system of unique user identifiers to identify clients 102. For example, ACE 160, using a user identifiers can identify a single user across multiple clients 102A-N. In some embodiments, client identifiers and/or user identifiers can be stored in data store 110. A specific authentication challenge 161 can include specific samples 163 based on information known about the identified user of client 102. For example, it might be known that the identified user of client 102 provides high-quality responses 164, and ACE 160 can increase the quantity of samples 163 that are provided to the identified user of client 102. In another example, the identified user of client 102 might indicate a specific subject matter expertise, and ACE 160 can include samples 163 related to the specific subject matter in an authentication challenge 161 provided to the identified user of client 102.

Access to resource 121 of third party systems 104 can be restricted to a subset of users of clients 102A-N that indicate they are a human. If the user of the client 102 indicates they are a human by successfully completing the authentication challenge 161, platform 120 can indicate to the third party system 104 that the user of the client 102 is a human. Platform 120 can store identification data for third party systems 104 that use the authentication challenges 161 to control access to a resource 121. In some embodiments, platform 120 can store identification data for respective resources 121 that are stored on third party systems 104. Platform 120 can indicate to the third party system 104 that a respective authentication challenge 161 has been provided to a client 102. Upon successful completion of the authentication challenge, platform 120 can indicate to the respective third party system 104 that the user of client 102 is a human. In some embodiments, platform 120 can provide multiple authentication challenges 161 to multiple clients 102A-N of multiple third party systems 104A-N simultaneously. In such embodiments, platform 120 can use third party system identifiers, client identifiers, authentication challenge identifiers, and/or resource identifiers for each respective third party system, client, authentication challenge, and/or resource to track a client interaction with an authentication challenge.

A user of a client 102 can indicate they are a human if their first response 164A to the first sample 163A corresponds to a known response 165. In some implementations, the first response 164A can correspond to the known response 165 if the two responses are an exact match. For example, for a first sample 163A "5+3," a first response 164A of "8" can correspond to the known response 165 of "8," because the two are an exact match. In some implementations, the first response 164A can be a variation of the known response 165. For example, for a first sample 163A "5+3," a first response 164A of "eight" can correspond to the known response 165 of "8," even though the two are not an exact alphanumeric match. In another example, for a first sample 163A, "Is the sky blue," a first response 164A of "yeah" can correspond to the known response 165 of "Yes," because both responses express the same idea (e.g., a confirmation), even though the two responses are not an exact alphanumeric match. It will be appreciated that while first sample 163A and first response 164A are described above with respect to known response 165, second sample 163B-N and second response 163B-N are similarly applicable. It will also be appreciated that "first" and "second" as used in the illustrative example of FIG. 1 are used only to identify specific items in a set, and do not necessarily indicate an order that samples 163 are provided to—or responses 164 are requested from—a user.

When a user of client 102 indicates they are a human, ACE 160 can collect responses 164 provided by the user of the client 102. Collected responses can be used as a part of training data to train a model 170. In some implementations, ACE 160 can collect responses 164 provided by the user of client 102 when the user of client 102 does not indicate they are a human. In some implementations, ACE 160 can store the responses 164 in data store 110. In some implementations, ACE 160 can collect a subset of responses 164. For example, ACE might not collect first response 164A, but can still collect second response 164B. In some implementations, ACE 160 can collect responses 164 based on a triggering event associated with the authentication challenge 161. For example, if a first response 164A of a user of client 102 corresponds to a known response 165 for first sample 163A (e.g., a triggering event, where the user of client 102 provided a correct response to the first sample 163A), ACE 160 can collect the second response 164B of the user of client 102. As described above, responses 164 from users of clients 102A-N can be used as a part of training data to train one or more models 170A-N. Further details regarding training and using models 170A-N are provided herein.

Server machine 130 can include a training set generator 131 that is capable of generating training data (e.g., a set of training inputs and a set of target outputs) to train models 170A-N. Training data can be associated with training a model 170 to generate a multimodal output (e.g., text, images, audio, video, etc.) based on a multimodal input. Training set generator 131 can obtain responses 164 as training input data from data store 110 and/or ACE 160. Training set generator 131 can accept responses 164 as training input data to generate a training corpus for the model 170. Training set generator 131 (or another component of system architecture 100) can store the generated corpus of training data at data store 110. In some implementations, training set generator 131 can generate training data that can be used to refine an already trained model 170. In some implementations, training set generator 131 can generate training data that can be used to train or refine a large language model (LLM).

In some implementations, training input data can be populated with historical variations of responses 164 previously collected by ACE 160. In some implementations, training set generator 131 can attach various labels to training input data used to generate training data. Examples of labels that can be attached to training input data can include response type labels, (e.g., whether the response 164 was provided for a sample 163 having a known response 165), multimodal labels (e.g., whether the response 164 was provided in response to text, visual, audio, and/or video presentation of a sample 163), and accuracy labels (e.g., a binary yes/no indicator of whether the response 164 for a sample 163 corresponded to the known response 165, or a degree of confidence that the response 164 corresponded to the associated known response 165).

Training set generator 131 can generate training data from a training data input (e.g., responses 164) based on (i) a degree of confidence that a particular response 164 satisfies a certain quality threshold, and (ii) the quantity of responses 164 available for a specific sample 163. Factors (i) and (ii) can each be independent considerations. For example, a user of client 102A is requested to respond to a first sample 163A having an associated known response 165A, a second sample 163B having an associated known response 165B, and a third sample 163C. The user of client 102A provides a first response 164A that corresponds to known response 165A and a second response 164B that does not correspond to the known response 165B. Thus, for this authentication challenge, because the user of client 102A only provided one correct response 164 to the two samples 163 having associated known responses, ACE 160 can indicate a low confidence level associated with the third response 164C provided by the user of client 102A. In some implementations, factors (i) and (ii) can be dependent considerations. For example, when a first response 164A deviates from a high quantity of responses 164A for first sample 163A, ACE 160 can indicate a relatively low degree of confidence that the first response 164A satisfies the certain quality threshold. The value of the certain quality threshold is configurable, and can be configured by user of the model 170A. In some implementations, the model 170A, or another model 170B-N can configure the value of the certain quality threshold. In some implementations, training set generator 131 can evaluate the quality of a particular response 164 based on additional considerations, including, for example, the completeness of the response 164, and a perceived relevance of the response 164 to the requested sample description.

In some implementations, ACE 160 can incorporate a client 102 identification system to identify repeat clients 102. In some implementations, ACE 160 can incorporate a user identification system to identify repeat users across multiple clients 102A-N. ACE 160 can determine that a specific user or a client 102A regularly provides responses 164 that satisfy a certain quality threshold. Thus, when the client 102A provides a first response 164A for a first sample 163A, the ACE 160 (or another component of system architecture 100) can indicate, based on user historical data, the first response 164A will likely satisfy the certain quality threshold.

In some implementations, model training can be supervised, and each set of training data can include a subset of training inputs and target outputs based on the identified data. To train a supervised model, training set generator 131 can generate training data including a subset of training inputs and a subset of target outputs. The subset of training inputs can include samples 163, and a subset of target outputs can include responses 164. In some implementations, a subset of training inputs can include responses 164, and a subset of target outputs can include samples 163. In some implementations, training set generator 131 can include an LLM that accepts responses 164 and generates similar descriptions based on the input of the responses 164 for a particular unknown sample 167. In some implementations, model training can be unsupervised. To train an unsupervised model, training set generator 131 can generate training data by clustering groups of historical responses 164 (e.g., included in data store 110) based on similarities between the historical responses 164, through dimensionality reduction by reducing the number of features in the data while retaining as much relevant information about the historical responses 164 as possible, by generating synthetic or partially synthetic data that resembles the original data, through anomaly detection by identifying parts of media items that are significantly different from the rest of the data, or through data augmentation by applying mathematical transformations to the training dataset.

Server machine 140 can include a training engine 141. Training engine 141 can train a machine learning model 170A-N using the training data from training set generator 131. The machine learning model 170A-N can refer to the model artifact that is created by the training engine 141 using the training data that includes training inputs. The model 170A-N can be composed of one or more layers, e.g., a single level of linear or non-linear operations (e.g., a support vector machine (SVM) or may be a deep network, i.e., a machine learning model that is composed of multiple levels of non-linear operations). An example of a deep network is a neural network with one or more hidden layers, and a neural network can be trained by, for example, adjusting the weights of the neural network in accordance with a backpropagation learning algorithm or the like. For convenience, the remainder of this disclosure will refer to the translation model as a neural network, even though some implementations might employ an SVM or other type of learning machine instead of, or in addition to, a neural network. In some implementations, the training set is obtained by training set generator 131 hosted by server machine 130. In some implementations, training engine 141 can train models 170A-N using a generative adversarial network (GAN). A GAN consists of two neural networks, one neural network is a generative MLM, and the other neural network is a discriminative MLM. GAN causes each of the two neural networks to engage in a competitive process against the other neural network. The generative MLM attempts to synthesize data that is indistinguishable from collected data (e.g., input data to the generative MLM), and the discriminative MLM attempts to differentiate between collected data and synthesized data. GAN training can iteratively refine the output of the generative MLM to align to the collected dataset more closely. In some implementations, training engine 141 can train models 170A-N using a variational autoencoder (VAE), which can introduce probabilistic encoding to represent input data. The probabilistic encoding can be processed through one or more layers and then decoded to reconstruct a generative output. VAE can provide a flexible framework for learning latent representations of data, which can result in a controlled, and continuously configurable output from a generative MLM.

Server machine 150 can include authentication challenge engine (ACE) 160 that provides and samples 163, and responses 164 to models 170A-N to obtain one or more outputs. Based on the outputs of the model 170, ACE 160 can generate a mapping between a sample 163 and a corresponding response 164. The ACE 160 can store generated mapping data in data store 110, a memory associated with a client 102, and/or another memory associated with system architecture 100. In some implementations, ACE 160 can provide known responses 165 to a model 170. In some implementations, ACE 160 can additionally provide response labels, as described above with respect to training set generator 131. The ACE 160 can obtain generated samples 163 from models 170A-N. In some implementations, the ACE 160 can obtain generated known responses 165 of samples 163 from models 170A-N.

In some implementations, ACE 160 can create an authentication challenge 161 for a user of a client 102 by generating samples 163 using a model 170A. Responses 164 to the samples 163 provided by the user of the client 102 can be used by training set generator 131 as training input data (e.g., as a part of training data) to generate training data to train the model 170A. In some implementations, ACE 160 can use a model 170B to collect and process the responses 164 from users of client 102A-N. The model 170B can be a generative MLM, such as an LLM. Training engine 141 can use the generated training data to further train (e.g., refine) the model 170A, thus completing an automated loop. That is, a model 170A can generate samples 163, and a model 170B can compile responses 164 into training data to train the model 170A. In some implementations, the automated loop can continue with minimal-to-no human interaction (e.g., without human data reviewer employees). Additional models 170C-N can be used to process the responses 164, generate predicted responses, or discriminate between responses. In some implementations, a single model 170 can perform the functions of multiple individual models 170A-N.

It should be noted that in some implementations, the functions of server machines 130, 140, and 150 or platform 120 may be provided by a fewer number of machines. For example, in some implementations the server machines 130 and 140 may be integrated into a single machine, while in other implementations the server machines 130, 140, and 150 may be integrated into multiple machines. In addition, in some implementations one or more of server machines 130, 140, and 150 can be integrated into platform 120. In some implementations, one or more of server machines 130, 140, and 150 can be integrated separately from platform 120.

In general, functions described in implementations as being performed by platform 120 and/or server machines 130-150 can also be performed on the client devices 102A-N in other implementations, if appropriate. In addition, the functionality attributed to a specific component can be performed by different or multiple components operating together. Platform 120 can also be accessed as a service provided to other systems or devices through appropriate application programming interfaces, and thus is not limited to use in websites.

In some implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of platform 120. Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a specific location of a user cannot be determined. Thus, the user can have control over what information is collected about the user, how that information is used, and what information is provided to the user.

FIG. 2 depicts a flow diagram of an example method 200 for automatically collecting training data for a generative MLM, in accordance with aspects of the present disclosure. Method 200 can be performed by processing logic that can include hardware (circuitry, dedicated logic, etc.), software (e.g., instructions run on a processing device), or a combination thereof. In one implementation, some or all operations of method 200 can be performed by one or more components of system architecture 100 of FIG. 1. In some implementations, some or all of the operations of method 200 can be performed by training engine 141 in connection with training set generator 131, as described above. In some implementations, operations of method 200 can be performed by ACE 160 as described above.

At operation 210, processing logic performing the method 200 requests a set of responses from a user, including subjective analytical responses. The request for the set of responses can be made as an authentication challenge to the user when the user attempts to access a resource with a restricted access that is included on a third party system (as described above with respect to FIG. 1). A set of samples can be provided in the authentication challenge along with the request for the set of responses. That is, users can be requested to respond to each provided sample. A subset of known samples of the set of samples can be associated with known responses. The subset of known samples can allow processing logic (such as processing logic of ACE 160 as described with respect to FIG. 1) to determine whether the user is a human, based on the user's responses to the subset of known samples.

A subset of unknown samples of the set of samples can be accompanied by a request for an analytical response from the user. A request for an analytical response can require the user to apply human intuition to respond to the unknown sample. In some implementations, the analytical response can be a subjective analytical response. For example, a request for a subjective analytical response can request user preference data, or a response to an open-ended request (e.g., where a user enters a description of the sample into a text box). Further details regarding provided samples and requested responses are described below with reference to FIGS. 3A-B.

At operation 220, processing logic can determine, based on the set of responses, that the user is a human. In some implementations, a subset of responses of the set of responses are evaluated to determine whether the user is a human. The set of responses can indicate that the user is a human if the subset of responses correspond to known responses. In some implementations, processing logic can indicate that the user is a human if responses from the user to known samples correspond to known responses (e.g., a correct response to the known samples). In the event that processing logic determines that the user is not a human, processing logic can terminate the authentication challenge. In some implementations, processing logic can present the user with another authentication challenge after the user failed the first authentication challenge. In some implementations, instead of terminating the authentication challenge, processing logic can provide additional samples to the user through the authentication challenge, and request responses to the additional samples.

Processing logic can compare the user response and the known response using, for example, an alphanumerical comparison. If the user response and the known response do not match exactly, the processing logic can indicate that the user is not a human. In some implementations, processing logic can use an MLM such as an LLM to process the responses from users to determine if the user response corresponds to a known response for a particular sample (e.g., is an exact match to, or variation of a known response 165). In some implementations, processing logic can incorporate a comparison tolerance such that user responses that do not exactly match the known response can still indicate that the user is a human. For example, processing logic can determine that a user response of "blue" corresponds to the known response of "Blue," and indicate the user is a human, even though the user response does not exactly match the known response. In another example, processing logic can determine that a user response of "seven" corresponds to the known response of "7," and indicate the user is a human, even though the user response does not exactly match the known response. In some implementations, the known response can include one or more variations. For example, processing logic can determine that a user response of "twenty-one" corresponds to one of the known responses of "21," "twenty one," and "twenty-one."

At operation 230, processing logic can use responses from the set of responses (e.g., a subset of responses) as a part of training data to train a machine learning model. In some implementations, processing logic can use user responses to unknown responses as a part of training data to train the machine learning model. In some implementations, the set of responses can be used as training input data to generate training data for the machine learning model. That is, the set of responses can be transformed by one or more operations or processes into usable training data by a training set generator, such as training set generator 131 as described with respect to FIG. 1.

FIG. 3A depicts a block diagram of an example portion of authentication challenge 300 that can be used to request a response 330 from a user, in accordance with aspects of the present disclosure. Sample 310, "The, girraffe has height;" is presented to the user. The request 320 provides instructions, and requests that the user provide a response 330. In some implementations, all, or parts of portion of authentication challenge 300 can be generated by an MLM.

In the illustrative example, the sample 310, "The, girraffe has height;" is a text sample that includes multiple errors. Identified from left to right, the first error is the extraneous comma, "," after "The." The second error is the misspelling of "girraffe," which should instead be "giraffe." The third error relates to the predicate of the sentence, "has height." While it isn't entirely clear, the sample 310 appears to be indicating that giraffes are tall. The third error can be corrected by changing the predicate from "has height" to "is tall." The fourth error in the text sample is the improper punctuation at the end of the text sample. As corrected, "The giraffe is tall," properly includes a subject and a predicate, and thus can be expressed as a full sentence. Sentences are terminated with a period "." However, sometimes sentences can also be terminated with an exclamation point "!" or a question mark "?" depending on the context of the sentence. Additional punctuation such as the colon ":" and the semi-colon ";" may be appropriate terminations to a complete subject and predicate pair. In the illustrative example, the correction of the fourth error can introduce more ambiguity. A user might provide a response 330 that includes "The giraffe is tall." The user might alternatively provide a response 330 that includes "The giraffe is tall!" Processing logic that provides sample 310 to a user and a request 320 for a response 330 can process ambiguities that might be included in responses 330. In some implementations, responses 330 can be processed by an MLM, such as a generative MLM or LLM.

In some implementations, sample 310 can be generated by an MLM, such as a generative MLM, or an LLM. In some implementations, the known response associated with the sample 310 (e.g., the correct answer used as a baseline to determine whether the user is a human) can be generated by an MLM. In some implementations, the portion of authentication challenge 300 (e.g., the sample, such as sample 310) can be presented in another medium such as an audio portion, a video portion, or an image.

The request 320 asks the user to rewrite the sample 310 and describe what errors (if any) were corrected. In the illustrative example, request 320 is an example of a request for an open-ended response. The request 320 asks the user to apply human intuition to provide an analytical response from a human. In some implementations, request 320 can ask the user to provide a subjective analysis of the sample 310. For example, request 320 might ask the user to describe the tone of the sample 310, or indicate a feeling experienced by the user associated with reading the sample 310. In the illustrative example, additional samples of subjective analysis that may be included in the response 330 relate to the predicate "has height" or the termination punctuation ";". For example, various response 330 to sample 310 might include, "The giraffe has long legs!," or "The giraffe is tall?". The termination punctuation provided by the user 330 in the response can indicate a tone of the text sample, and can reflect a subjective analysis of the sample 310.

As demonstrated above, due to various factors, it is unlikely that a user will produce a response 330 to an open-ended request 320 that exactly matches a known sample associated with the sample 310. Even if the user includes a corrected sentence in the response 330 that exactly matches the corrected sentence in the known response associated with sample 310, the user is unlikely to describe the errors in exactly the same way. For example, many users might intuitively make the four corrections to sample 310, including changing the predicate "has height" to "is tall," or similar. But when describing the changes, many users may not know that the portion of the sample 310, "has height," is a predicate, and so might struggle to describe how or why that change was made. The processing logic that provides portion of authentication challenge 300 (e.g., ACE 160 as described with respect to FIG. 1) can be configured to accept the response 330 and determine whether the response 330 corresponds to a known response for the sample 310 (as described with reference to FIG. 2). In some implementations, the processing logic can use an LLM to determine whether the response 330 corresponds to the known response for the sample 310. In implementations where the presented sample is not a text sample, the request 320 can request a response 330 from the user that identifies errors in the sample 310 that is presented, such as a flaw in an image, a missing frame in a video, or an audio error in an audio portion. In a particular embodiment, a request 320 for a response 330 can ask the user to indicate on an image, the location of requested features or errors by selecting a portion of the image, and/or drawing on or highlighting a portion of the image that contains the requested feature or error.

The response 330 is an example of an open-ended response 330 from the user for the sample 310. In some implementations, portions of the response 330 can be used to determine whether the user is a human, while other portions of the response 330 can be used as part of training data to train a machine learning model. In some implementations, portions of the response 330 used to determine whether the user is a human can be used as part of training data to train the machine learning model. In some implementations, the response 330 can be collected in formats other than text input. For example, the response 330 might be collected as an audio input provided by the user, a drawing by the user, or a selection by the user.

FIG. 3B is a block diagram of an example portion of authentication challenge 350 that can be used to request a response 380 from a user, in accordance with aspects of the present disclosure. The sample 360, including first image 361 and second image 362, is presented to the user. The request 370 provides instructions, and requests that the user provide a response 380. In some implementations, all, or parts of portion of authentication challenge 350 can be generated by an MLM.

In the illustrative example, sample 360 with first image 361 and second image 362 is presented to request an analytical response from the user. In some implementations, the analytical response can be a subjective analytical response, or preferential response. Sample 360 can present the first image 361 and second image 362 side-by-side for a side-by-side comparison to be performed by the user. First image 361 and second image 362 can be visually similar, or visually dissimilar. In some implementations, first image 361 and second image 362 can share a theme, subject, color space, tone, or other characteristic. Additional images (i.e., three or more images) can be presented to the user (not illustrated). In some implementations, first image 361 and/or second image 362 can be generated by an MLM, such as a generative MLM. In some implementations, other mediums can be presented to the user, such as a first and second video portion, a first and second audio portion, or a first and second text sample (e.g., such as the sample 310 text sample described with respect to FIG. 3A).

The request 370 asks the user to perform a side-by-side (SxS) comparison, and select a preferred image from between the first image 361 and the second image 362. The request 370 further asks the user to provide justification to rationalize why the preferred image was selected. The request 370 can be structured to cause a user to provide a response 380 that includes a sample of human analysis, such as human subjective analysis, a human perception, or indication of human intuition. In some implementations, the request asks the user to identify in the response 380, errors in one or both of first image 361 and second image 362. In some implementations, a user may be requested to select first image 361 or second image 362 based on a particular portion, or characteristic of the image. For example, request 370 might ask a user to select the image preferred by the user based on the upper right quadrant of the first image 361 and the second image 362 (e.g., a portion of the images). In another example, request 370 might ask a user to ignore the details of the first image 361 and second image 362, and instead select the image that has a color palate, or tone that is preferred by the user. As described above, in some implementations, sample 360 can also present other mediums to the user for side-by-side (SxS) comparison, such as audio portions, video portions, or text samples, and request 370 can ask for a response 380 from the user to distinguish one of the presented mediums from the other presented mediums.

The request 370 can request a response 380 from a user that will include objective information and subjective information. The objective information included in the response 380 can be used to determine the user is a human (e.g., does the objective information from the user about sample 360 match known information about sample 360). In some implementations, the subjective information provided by the user in response 380 can be used as part of training data to train a machine learning model. In some implementations, the objective information used to determine whether the user is human can be used to train a machine learning model.

The response 380 is an example of an open ended response 380 from the user for the sample 360. In some implementations, portions of the response 380 can be used to determine whether the user is a human, while other portions of the response 380 can be used as part of training data to train a machine learning model. In some implementations, the response 380 can be collected in formats other than text input. For example, the response 380 might be collected as an audio input provided by the user.

FIG. 4 depicts a flow diagram of an example method 400 for automatically obtaining, using authentication challenges, training data to train a machine learning model, in accordance with aspects of the present disclosure. Method 400 can be performed by processing logic that can include hardware (circuitry, dedicated logic, etc.), software (e.g., instructions run on a processing device), or a combination thereof. In one implementation, some, or all of the operations of method 400 can be performed by one or more components of system architecture 100 of FIG. 1. In some implementations, some, or all of the operations of method 400 can be performed by ACE 160 as described above.

At operation 410, processing logic performing the method 400 identifies a generative machine learning model (MLM) to be trained using training data reflecting analytical responses of humans. In some implementations, the generative MLM can include at least one of a regression model, a neural network, a supervised model, or an unsupervised model.

At operation 420, processing logic automatically collects the training data for the generative MLM. Automatically collecting the training data includes the operations 421 and 422.

At operation 421, processing logic provides an authentication challenge for each user attempting to access a resource of a third party system. The authentication challenge requests a set of responses from a respective user, and the set of responses include a first response to a first sample, the first response indicating whether the respective user is a human, and a second response to a second sample, the second response indicating an analytical response of the respective user. In some implementations, processing logic can generate an authentication challenge for a user requesting access to the resource of a third party system having a restricted access. In some implementations, processing logic can select the authentication challenge from a database including multiple authentication challenges. Various authentication challenges can be presented to various users. In some implementations, the same portions of a respective authentication challenge can be presented to multiple users, while other portions of the respective authentication challenges can vary user to user. In some implementations, authentication challenges can be unique to a particular user. For example, processing logic can determine that a specific user has specific subject matter expertise, and can provide authentication challenges to the specific user that include portions of the specific subject matter expertise.

The first sample can have an associated known response (e.g., a "correct" response). The first response indicates that a user is a human if the first response corresponds to the known response associated with the first sample. In some implementations the first sample can be presented as the second sample (i.e., a first response and a second response can be requested for a single sample). For example, authentication challenge can present a sample with three shapes, a triangle, a circle, and a square. The authentication challenge can request a user response that (i) identifies the quantity of shapes (e.g., three shapes), and (ii) selects the shape that the user most prefers (which might be any shape of the triangle, circle, or square). In some implementations, the first response to the first sample can be used as a preliminary determination of whether the respective user is a human. A third response to a third sample in the authentication challenge can provide a confirmation of the preliminary determination. In some implementations, the third response to the third sample can indicate a second analytical response of the respective user.

In some implementations, providing the authentication challenge for each user attempting to access the resource of the third party system can include selecting, by the processing logic, from multiple samples, a known sample to be used as the first sample. The known sample can be associated with a known description. The processing logic can select, from multiple samples, an unknown sample to be used as the second sample. The first response can indicate the respective user is a human if the first response corresponds to the known description associated with the known sample. In some implementations, the known description can be based on historical responses from a historical authentication challenge provided to a historical user. In some implementations, processing logic can generate, using a generative MLM (such as a large language model (LLM)) the known description of the known sample. In some implementations, processing logic can generate, using the generative MLM, the unknown sample.

In some implementations, the first sample can be a text sample. The request from the authentication challenge to provide the first response can present the text sample to the respective user, and instruct the respective user to describe any error in the text sample. In some implementations, the second sample can be a text sample. The request from the authentication challenge to provide the second response can present the text sample to the respective user, and instruct the respective user to describe any error in the text sample. In some implementations, the second sample can include a set of images. The request from the authentication challenge to provide the second response can present the set of images to the respective user, instruct the respective user to select, from the set of images, a preferred image, and instruct the respective user to provide a justification for the selection of the preferred image. In some implementations, the set of responses requested by the authentication challenge can include a third response to a third sample. In some implementations, the third response can indicate whether the respective user is a human. In some implementations, the third response can indicate a second analytical response of the respective user.

At operation 422, responsive to determining, based on the set of responses, that the respective user is a human, processing logic uses the second response provided by the respective user as part of the training data for the at least one generative MLM. The at least one generative MLM can be trained to accept prompts (e.g., input data) and synthesize an output response to the prompt based on learned patterns and relationships between foundational training data and/or fine-tuning training data used to train the at least one generative MLM. In some implementations, the at least one generative MLM can be trained to accept generalized prompts and generate generalized responses (e.g., similar to a general purpose web-indexer search engine). In some implementations, the at least one generative MLM can be trained to accept generalized prompts, and generate a particular scope of responses. For example, a generative MLM can be trained to accept essay submissions, and generate grammar corrections, or tone suggestions for a respective essay submission input. In another example, a generative MLM can be trained to accept any text input, and generate outputs of a specific scope, such as poems or song lyrics. In some implementations, the at least one generative MLM can be trained to accept prompts of a particular scope, and generate a corresponding particular scope of responses. For example, a generative MLM can be refined using a fine-tuning training dataset to accept prompts about physics, and provide answers (e.g., generated responses) to the prompts about physics. In such an example, prompts outside of the scope of physics, such as prompts regarding music theory might be ignored by the fine-tuned generative MLM, or a response to out-of-scope prompts can be to indicate that the fine-tuned generative MLM is not trained to respond to the subject matter.

In some implementations, a subset of training data can be used to train the generative MLM. The responses in the subset of training data can be selected based on (i) a quantity of samples provided to a respective user that received an associated response, and (ii) a quantity of users that provided a response to for a particular sample. Regarding consideration (i), for example, a user might receive three samples in an authentication challenge and be requested to provide three corresponding responses. If the user only provides two corresponding responses the user will not complete the authentication challenge. Processing logic can indicate that responses to incomplete authentication challenges are of a lower quality than responses to complete authentication challenges. In some implementations, responses from a user can be rated on a per-authentication challenge basis. That is, responses will be rated based on the user's responses in a single authentication challenge. In some implementations, responses from a user can be rated on per-interaction basis with the authentication challenge engine, such as ACE 160 as described with respect to FIG. 1. The authentication challenge engine can use identifiers to uniquely identify a particular user across multiple authentication challenges. Over time, the authentication challenge engine can determine that the particular user tends to provide responses that satisfy a certain quality, and so responses from the particular user can be determined to be of a higher quality than responses from a generic user. Similarly, if the authentication challenge engine determines that the particular user tends to provide responses that do not satisfy the certain quality, then responses from the particular user can be determined to be of a lower quality than responses from a generic user. Regarding consideration (ii), for example, a particular sample that has received 1,000 user responses is more likely to have higher quality (e.g., consistent) responses than another sample that has received 2 user responses. In some implementations, processing logic can identify a user as having specialized knowledge pertaining to a subject matter. In sum implementations, processing logic can provide samples reflecting the subject matter in authentication challenges for the user.

In some implementations, the unknown sample can be converted to a known sample upon collecting a sufficient number of matching responses to the unknown sample, where the sufficient number represents a value that exceeds a predetermined threshold. In some implementations, a generative MLM can be used to generate a response to a known sample. The generated response from the MLM can be compared to the known response to assess the performance of the generative MLM. In some implementations, the generative MLM can generate the unknown sample. In some implementations, processing logic can indicate that the respective user is authorized to access the resource of the third party system having the restricted access once the user has indicated they are a human. Processing logic can indicate, based on the determination that the respective user is a human, that the respective user should be authorized to access the resource of the third party system having the restricted access.

Figure 5:
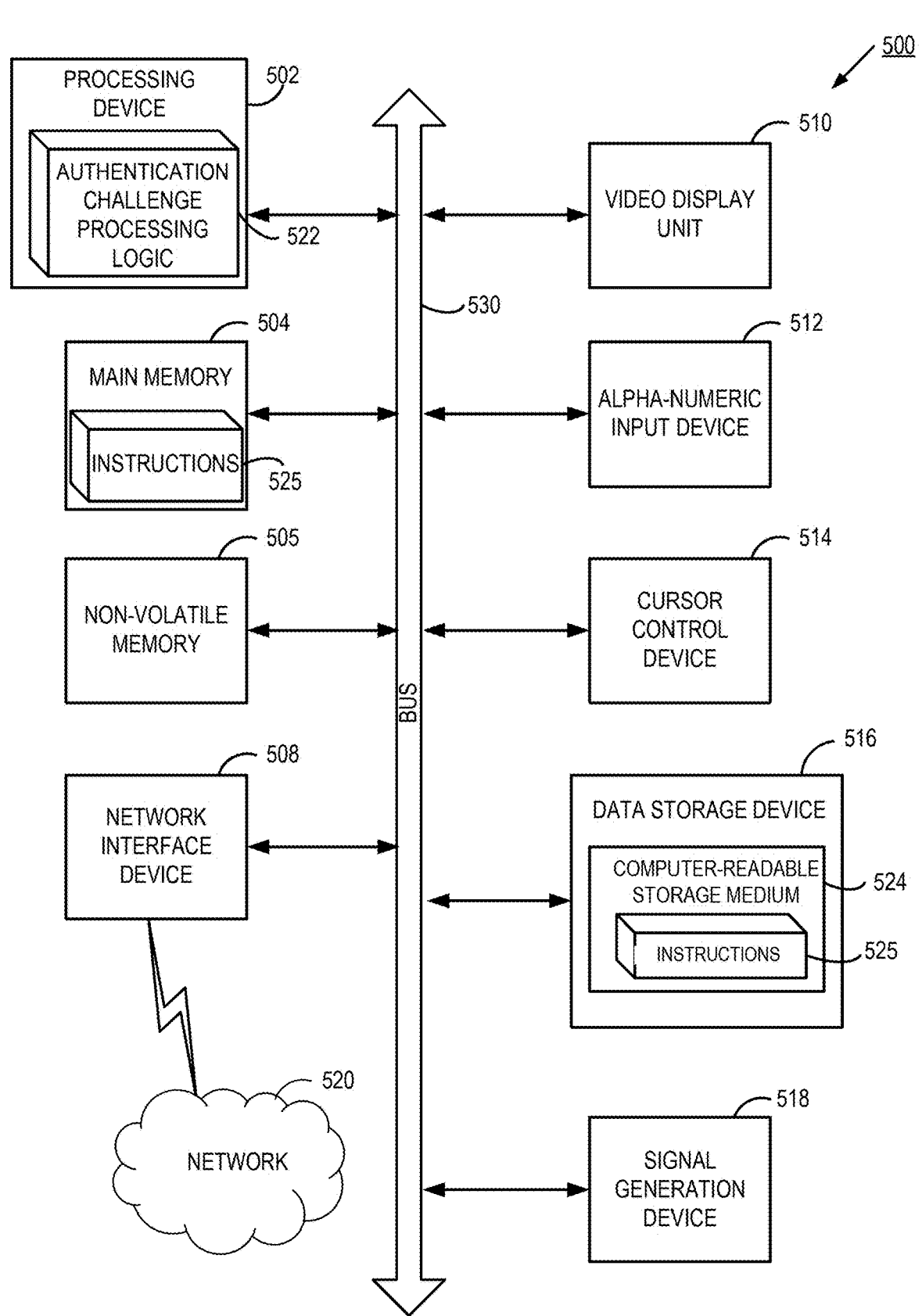
FIG. 5 is a block diagram illustrating an exemplary computer system, in accordance with aspects of the present disclosure.

FIG. 5 is a block diagram illustrating an example computer system 500, in accordance with aspects of the present disclosure. The computer system 500 can correspond to platform 120 and/or client devices 102A-N, described in FIG. 1. Computer system 500 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., a processor), a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 516, which communicate with each other via a bus 530.

Processing device 502 represents one or more general-purpose processing devices such as a microprocessor, central processing unit, or the like. More specifically, processing device 502 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute translation processing logic 522 (e.g., for providing authentication challenges to users) for performing the operations discussed herein. The processing device 502 can be configured to execute instructions 525 stored in main memory 504. Non-volatile memory 505 can store the instructions 525 when they are not being executed, and can store additional system data that can be accessed by processing device 502.

The computer system 500 can further include a network interface device 508. The computer system 500 also can include a video display unit 510 (e.g., a liquid crystal display (LCD) or a cathode ray tube (CRT)), an input device 512 (e.g., a keyboard, and alphanumeric keyboard, a motion sensing input device, touch screen), a cursor control device 514 (e.g., a mouse), and a signal generation device 518 (e.g., a speaker).

The data storage device 516 can include a computer-readable storage medium 524 (e.g., a non-transitory machine-readable storage medium) 524 on which is stored one or more sets of instructions 525 (e.g., for generating variations of a translated audio portion) embodying any one or more of the methodologies or functions described herein. The instructions can also reside, completely or at least partially, within the main memory 504 and/or within the processing device 502 during execution thereof by the computer system 500, the main memory 504 and the processing device 502 also constituting machine-readable storage media. The instructions can further be transmitted or received over a network 520 via the network interface device 508.

While the computer-readable storage medium 524 (machine-readable storage medium) is illustrated in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a specific feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the specific features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specific by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

identifying at least one generative machine learning model (MLM) to be trained using training data reflecting analytical responses of humans; and automatically collecting the training data for the at least one generative MLM from a plurality of users, wherein automatically collecting the training data comprises:

providing an authentication challenge for each user attempting to access a resource, wherein the authentication challenge requests that a respective user of the plurality of users the provide a set of responses comprising a first user response to a first sample, wherein the first user response indicates that the respective user is a human by identifying one or more errors in the first sample, and a second user response to a second sample, wherein the second user response indicates an analytical response of the respective user; and responsive to determining, based on the set of responses, that the respective user is a human, using the second user response provided by the respective user as part of the training data for the generative MLM.

2. The method of claim 1, wherein the first sample comprises a text sample, and wherein requesting the respective user to provide the first user response comprises:

presenting the text sample to the respective user; and instructing the respective user to describe any error in the text sample.

3. The method of claim 1, wherein the second sample comprises a text sample, and wherein requesting the respective user to provide the second user response comprises:

presenting the text sample to the respective user; and instructing the respective user to describe any error present in the text sample.

4. The method of claim 1, wherein the second sample comprises a set of images, and wherein requesting the respective user to provide the second user response comprises:

presenting the set of images to the respective user;

instructing the respective user to select, from the set of images, a preferred image; and instructing the respective user to provide a justification for the selection of the preferred image.

5. The method of claim 1, wherein the first user response is used for a preliminary determination of whether the respective user is a human, and the set of responses requested by the authentication challenge comprise a third user response to a third sample to provide a confirmation of the preliminary determination.

6. The method of claim 1, wherein the set of responses requested by the authentication challenge comprise a third user response to a third sample, wherein the third user response indicates a second analytical response of the respective user.

7. The method of claim 1, wherein providing the authentication challenge for each user attempting to access the resource comprises:

selecting, from a plurality of samples, a known sample having a known response for use as the first sample; and selecting, from the plurality of samples, an unknown sample not having a known response for use as the second sample.

8. The method of claim 7, wherein the first user response indicates that the respective user is a human if the first user response corresponds to the known response.

9. The method of claim 8, further comprising:

converting the unknown sample to the known sample upon collecting a sufficient number of matching responses to the unknown sample, wherein the sufficient number represents a number that exceeds a threshold.

10. The method of claim 7, further comprising:

generating, using one of the at least one generative MLM, a generated response to the known sample; and comparing the generated response to the known response to assess performance of the one of the at least one generative MLM.

11. The method of claim 7, further comprising:

generating, using one of the at least one generative MLM, the unknown sample.

12. The method of claim 1, wherein the second sample and the second user response provided by the respective user for the second sample are selected for a subset of training data to train the generative MLM based on (i) a quantity of samples provided to the respective user that received an associated response, and (ii) a quantity of users that provided a second response to the second sample.

13. A system comprising:

a memory; and a processor communicatively coupled to the memory, the processor to perform operations comprising:

identifying at least one generative machine learning model (MLM) to be trained using training data reflecting analytical responses of humans; and automatically collecting the training data for the at least one generative MLM from a plurality of users, wherein automatically collecting the training data comprises:

providing an authentication challenge for each user attempting to access a resource, wherein the authentication challenge requests that a respective user of the plurality of users provide a set of responses comprising a first user response to a first sample, wherein the first user response indicates that the respective user is a human by identifying one or more errors in the first sample, and a second user response to a second sample, that the second user response indicates an analytical response of the respective user; and responsive to determining, based on the set of responses, that the respective user is a human, using the second user response provided by the respective user as part of the training data for the generative MLM.

14. The system of claim 13, wherein the first user response indicates that the respective user is a human if the first user response corresponds to a known response to a known sample.

15. The system of claim 13, the operations further comprising:

generating, using one of the at least one generative MLM, the second sample.

16. The system of claim 13, wherein the second sample comprises a set of subsamples, and wherein requesting the respective user to provide the second user response comprises:

presenting the set of subsamples to the respective user;

instructing the respective user to select, from the set of subsamples, a preferred subsample; and instructing the respective user to provide a justification for the selection of the preferred subsample.

17. The system of claim 13, wherein the at least one generative MLM is trained on a subset of the training data, wherein the second sample and the second user response provided by the respective user for the second sample are selected for the subset of training data based on (i) a quantity of samples provided to the respective user that received an associated response, and (ii) a quantity of users that provided a second response to the second sample.

18. A non-transitory computer readable storage medium comprising instructions for a server that, when executed by a processing device, cause the processing device to perform operations comprising:

identifying at least one generative machine learning model (MLM) to be training using training data reflecting analytical responses of humans; and automatically collecting the training data for the at least one generative MLM from a plurality of users, wherein automatically collecting the training data comprises:

providing an authentication challenge for each user attempting to access a resource, wherein the authentication challenge requests that a respective user of the plurality of users the provide a set of responses comprising a first user response to a first sample, wherein the first user response indicates that the respective user is a human by identifying one or more errors in the first sample, and a second user response to a second sample, wherein the second user response indicates an analytical response of the respective user; and responsive to determining, based on the set of responses, that the respective user is a human, using the second user response provided by the respective user as part of the training data for the generative MLM.

19. The non-transitory computer readable storage medium of claim 18, the operations further comprising:

generating, using one of the at least one generative MLM, the second sample.

20. The non-transitory computer readable storage medium of claim 18, wherein the at least one generative MLM is trained on a subset of the training data, wherein the second sample and the second user response provided by the respective user for the second sample are selected for the subset of training data based on (i) a quantity of samples provided to the respective user that received an associated response, and (ii) a quantity of users that provided a second response to the second sample.

*   *   *   *   *